(12) United States Patent
Peirce et al.

(10) Patent No.: US 8,582,775 B2
(45) Date of Patent: Nov. 12, 2013

(54) METHOD OF SECURING AND AUTHENTICATING DATA USING MICRO-CERTIFICATES

(75) Inventors: Kenneth L. Peirce, Grosse Pointe Farms, MI (US); Sethu K. Madhavan, Canton, MI (US); James J. Piwowarski, Holly, MI (US)

(73) Assignee: General Motors LLC, Detroit, MI (US)

( * ) Notice: Subject to any disclaimer, the term of this patent is extended or adjusted under 35 U.S.C. 154(b) by 1247 days.

(21) Appl. No.: 12/370,075

(22) Filed: Feb. 12, 2009

(65) Prior Publication Data

US 2010/0202616 A1 Aug. 12, 2010

(51) Int. Cl.
*H04L 9/08* (2006.01)
(52) U.S. Cl.
USPC ............................ 380/277; 380/270; 713/171
(58) Field of Classification Search
USPC ................................... 370/277, 270; 713/171
See application file for complete search history.

(56) References Cited

U.S. PATENT DOCUMENTS

| 5,717,758 | A | 2/1998 | Micall | |
|---|---|---|---|---|
| 6,792,530 | B1 | 9/2004 | Qu et al. | |
| 7,051,206 | B1* | 5/2006 | Giest et al. | 713/176 |
| 7,228,420 | B2* | 6/2007 | Dabbish et al. | 713/170 |
| 7,395,426 | B2* | 7/2008 | Lee et al. | 713/168 |
| 7,734,050 | B2* | 6/2010 | Tengler et al. | 380/270 |
| 7,742,603 | B2* | 6/2010 | Tengler et al. | 380/270 |
| 7,849,308 | B2* | 12/2010 | Suga | 713/157 |
| 7,904,721 | B2* | 3/2011 | Belenky et al. | 713/175 |
| 7,934,095 | B2* | 4/2011 | Laberteaux et al. | 713/169 |
| 7,995,752 | B2* | 8/2011 | Lambert et al. | 380/44 |
| 8,171,283 | B2* | 5/2012 | Pietrowicz et al. | 713/156 |
| 2005/0066171 | A1* | 3/2005 | Simon | 713/175 |
| 2005/0114651 | A1* | 5/2005 | Qu et al. | 713/156 |
| 2005/0213758 | A1* | 9/2005 | Lenstra et al. | 380/44 |
| 2008/0028291 | A1 | 1/2008 | Vion-Dury | |
| 2009/0003597 | A1* | 1/2009 | Gantman et al. | 380/44 |

FOREIGN PATENT DOCUMENTS

CN 1860725 11/2006

* cited by examiner

*Primary Examiner* — Amare F Tabor
(74) *Attorney, Agent, or Firm* — Anthony Luke Simon; Reising Ethington P.C.

(57) ABSTRACT

A method of securing wireless communications includes storing a recipient's micro-certificate at a vehicle, a call center, or a certificate authority, transmitting the micro-certificate from its place of storage, extracting the public key from the micro-certificate, encrypting the vehicle communication using the public key, transmitting the encrypted vehicle communication to the recipient, and decrypting the vehicle communication using a private key after receiving the vehicle communication. The micro-certificate can include identifying data for the recipient and can have a length that is less than twice the length of the public key contained in the micro-certificate.

19 Claims, 2 Drawing Sheets

METHOD OF SECURING AND AUTHENTICATING DATA USING MICRO-CERTIFICATES

TECHNICAL FIELD

The present invention relates generally to techniques for secure communication between wireless devices and, more particularly, to authentication techniques using digital certificates to provide secure communication between two entities such as a vehicle and a central call center.

BACKGROUND OF THE INVENTION

Transport Layer Security (TLS) is a known technology used in digital networks to establish and carry out secure communication between two entities. The communicating entities can be devices such as computers or other electronic apparatus capable of digital communication, and the two entities can be communicating as peers or in a client/server configuration. TLS is implemented using digital certificates which, through public key cryptography and a common trusted entity, enable one or both of the communicating entities to authenticate the other and enable the two entities to exchange information confidentially. Secure Socket Layers (SSL) is an earlier form or predecessor of TLS that has been widely used over the Internet.

TLS is commonly used in TCP/IP networks using x.509 digital certificates which are typically issued by a trusted third party certificate authority (CA) and signed with the CA's private key. The holder (subject) of the certificate can then use it to authenticate itself to other entities. The associated CA public key is distributed to those entities as a part of a self-signed certificate. Authentication of a received digital certificate then involves using the CA's public key to decrypt the digital signature and compare the result to the contents actually contained in the certificate. More specifically, when the certificate is originally signed, a hash is performed of the certificate's contents and the result is encrypted using the CA's private key. This encrypted result is used as the digital signature and is appended to the certificate. Then, to authenticate, a recipient of the certificate uses the public key to decrypt the hash, and then compares this decrypted hash result with its own hash of the received certificate data items that it takes using the same hash function. If the two results match, then this indicates that the contents of the certificate are authentic. That authenticated content includes the certificate holder's (subject's) identity and public key so that the recipient of the certificate can now know that the identity is authentic and can communicate confidentially with the subject using its public key.

The basic structure of an X.509 certificate is given in Table I below. It includes three main fields: a TBS (to be signed) Certificate field containing a number of data items, a Signature Algorithm field identifying the algorithm used in producing the signature, as well as a Signature Value field containing the digital signature that is used by the CA to sign the certificate. The details of x.509 v.3 certificates are contained in RFC 3280.

TABLE I

| x.509 Certificate |
|---|
| TBS Certificate |
|   Version |
|   Serial number |

TABLE I-continued

| x.509 Certificate |
|---|
|   Signature |
|   Issuer |
|   Validity |
|     UTC Time |
|     Generalized Time |
|   Subject |
|   Subject Public Key Info |
|   Unique Identifiers |
|   Extensions |
| Signature Algorithm |
| Signature Value |

In wireless vehicle communication between a vehicle and call center, the use of x.509 or other digital certificates enables TLS to be used to authenticate both the vehicle and call center to each other and to allow confidential exchange of data, programming, or commands. Typically, this communication is via a wireless cellular network using CDMA or other suitable communication technology. Because the size of the certificates can be 1024 bytes or more, the exchange of these digital certificates each time a connection is made can be somewhat costly.

SUMMARY OF THE INVENTION

According to an aspect of the invention, there is provided a method of securing wireless communications. The method includes storing a recipient's micro-certificate at a vehicle, a call center, or a certificate authority, transmitting the micro-certificate from its place of storage, extracting the public key from the micro-certificate, encrypting a vehicle communication using the public key, transmitting the encrypted vehicle communication, and decrypting the vehicle communication using a private key after receiving the vehicle communication. The micro-certificate includes a public key having a length that is more than half the overall length of the micro-certificate.

In accordance with another aspect of the invention, there is provided a method of securing wireless communications. The method includes storing a private key at a vehicle, requesting a micro-certificate that includes a public key belonging to a recipient and an identifying data string at a vehicle telematics unit, receiving the micro-certificate at the vehicle, extracting the public key belonging to the recipient from the micro-certificate, generating a first encryption of a vehicle communication that is encrypted using the extracted public key belonging to the recipient, performing a second encryption on the generated first encrypted vehicle communication using the private key stored at the vehicle, and transmitting the results of the second encryption between a vehicle and the recipient.

In accordance with yet another aspect of the invention, there is provided a method of securing wireless communications. The method includes storing a private key at a call center, requesting a micro-certificate that includes a public key belonging to a vehicle and an identifying data string at the call center, receiving the micro-certificate at the call center, extracting the public key belonging to the vehicle from the micro-certificate, generating a first encryption of a vehicle communication that is encrypted using the extracted public key belonging to the vehicle, performing a second encryption on the generated first encrypted vehicle communication using the private key stored at the call center, and transmitting the results of the second encryption between a call center and a vehicle.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

Figure 1:
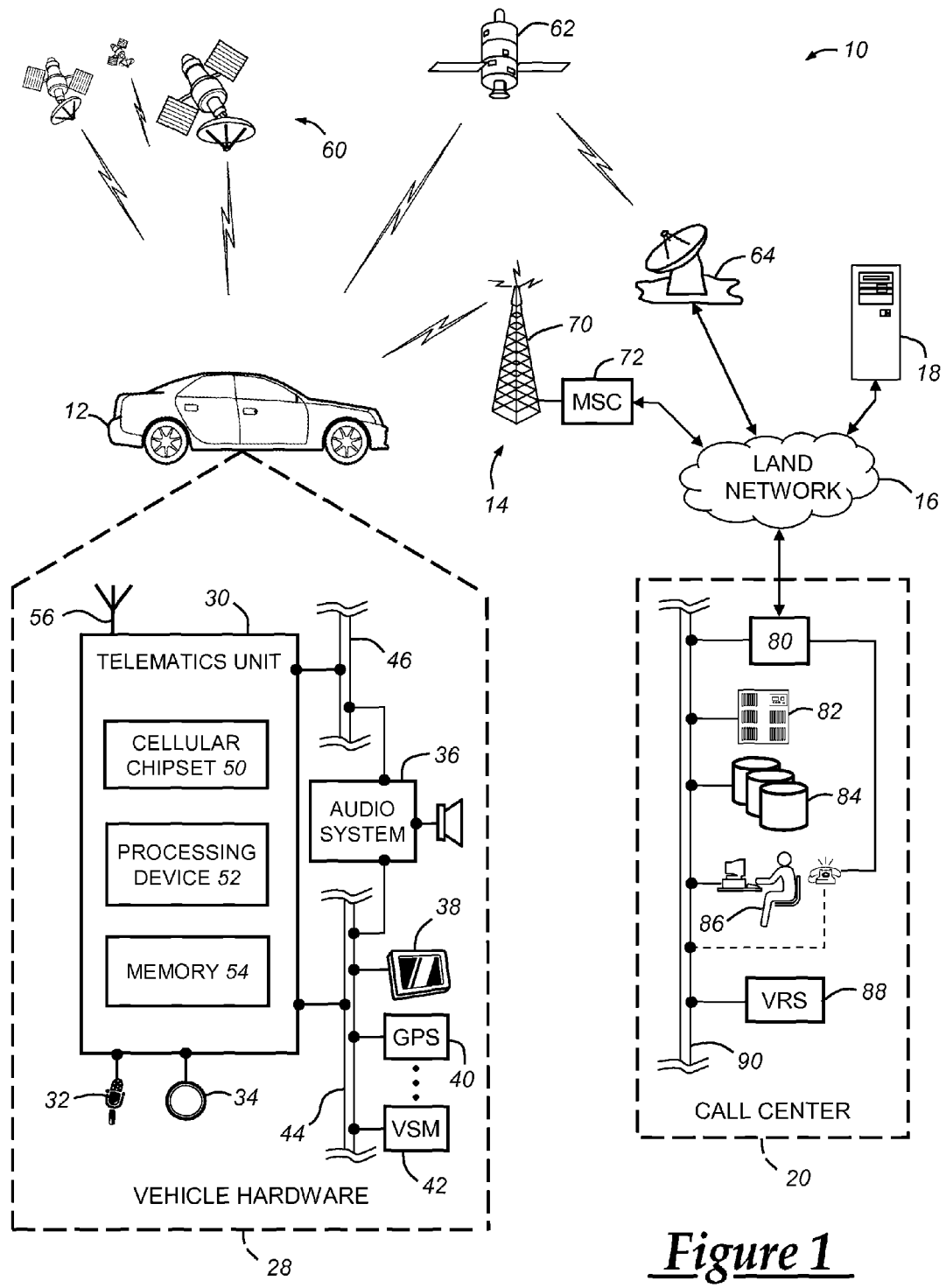
FIG. 1 is a block diagram depicting an exemplary embodiment of a communications system that is capable of utilizing the method disclosed herein.

The method described below in conjunction with FIGS. 1 and 2 can be carried out as part of the vehicle communications system shown in FIG. 1. One particular use of the methods is in establishing secure communication between a vehicle and call center so that data, commands, and programming can be shared between the two entities. However, they could also be used for secure, efficient communication directly between two vehicles, or between a vehicle and other mobile device, or between a vehicle and some fixed facility other than a call center. The methods are also applicable generally to wireless devices of any type, such as those used in wireless sensor networks. Given the disclosure in this specification and its drawings, those skilled in the art will be able to implement the methods and micro-certificates disclosed herein for communication between a wide range of wireless devices. As used herein, the term "wireless device" includes any device, equipment or facility capable of wireless communication by any means suitable for transmitting digital data. As indicated above, this can include portable or mobile devices, as well as fixed equipment and facilities such as the call center depicted in FIG. 1.

In one implementation, secure communication between a vehicle and a call center can involve the use of micro-certificates. Micro-certificates, such as an implicit certificate used in elliptical curve cryptography, can be used to secure data and voice transmissions between a telematics unit of a vehicle and a call center. And the micro-certificates can do so while occupying less data space than other encryption techniques. For instance, while the aforementioned x.509 digital certificates can fill 1024 bytes or more of space, micro-certificates can be implemented using no more than 44 bytes. Micro-certificates can be employed within the structure of Elliptic Curve Cryptography (ECC), also known as an Elliptic Curve Integrated Encryption Scheme. Other known schemes include the Elliptic Curve Diffie-Hellman key agreement scheme, the Elliptic Curve Digital Signature Algorithm, and the Elliptical Curve Menezes-Qu-Vannstone key agreement scheme. A representation of a micro-certificate is shown below.

TABLE II

| Byte | Content |
| --- | --- |
| 0 | Entity Type |
| 1 | ID MS Byte |
| 2 | . |
| 3 | . |
| 4 | ID LS Byte |
| 5 | Time of Expiration MS Byte |
| 6 | . |
| 7 | . |
| 8 | . |
| 9 | . |
| 10 | Time of Expiration LS Byte |
| 11 | Signature/Public Key MS Byte |
| . | . |
| . | . |
| . | . |
| 43 | Signature/Public Key LS Byte |

The entity type can be used to differentiate between the call center and a vehicle, or between different types of vehicles or other entities that communicate with the vehicle. The four byte ID can be, for a vehicle, a station ID (STID) that uniquely identifies the telematics unit and/or vehicle, or can be some other vehicle identifier. For the call center, the ID can be used as an identifier or for some other purpose, if desired. Either the entity type or ID, or both, can be used as an identifying data string that uniquely identifies the entity to which the certificate is assigned. A suitable micro-certificate for use with the methods disclosed herein, such as that shown in Table II above, is comprised primarily of the public key such that the length of the public key is more than half the overall length of the micro-certificate. In the example above, the length of the public key is actually more than three-fourths the length of the micro-certificate.

Implicit certificates include a public key certificate and digital signature that are superimposed upon one another. Or in other words, implicit certificates involve a public key that is not distinct from the digital signature as is the case with x.509 certificates. Rather, the public key and digital signature are combined and the entity receiving the implicit certificate can derive the public key from the combination. Implicit certificates can include a user's identity (I) and some reconstructed public data (P) that together with a certifying authority's public key can be used to reconstruct a user's public key. Implicit certificates can be requested and received from a certificate authority or can be requested from the vehicle or call center.

In one example, the bandwidth of a commonly-used telematics modem, such as the Airbiquity™ modem used over a CDMA voice connection is about 70 bits per second. In relation to an x.509 certificate, use of the micro-certificate can reduce the amount of time between presentation of the certificate and authentication of the certificate during which the modem authenticates a communication. Comparing the processing times of the 44 byte micro-certificate to the 1024 byte x.509 certificate using the bandwidth of the Airbiquity™ modem, the micro-certificate reduces processing time. In this case, using the Airbiquity™ modem, the transmission time of the 44 byte micro-certificate is approximately 4.9 seconds while the 1024 byte x.509 certificate is approximately 117 seconds. Processing an x.509 certificate or a micro-certificate can be the first operation executed by the telematics unit or the call center. So decreasing latency length before the incoming communication is verified can help to improve customer perception of response time.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
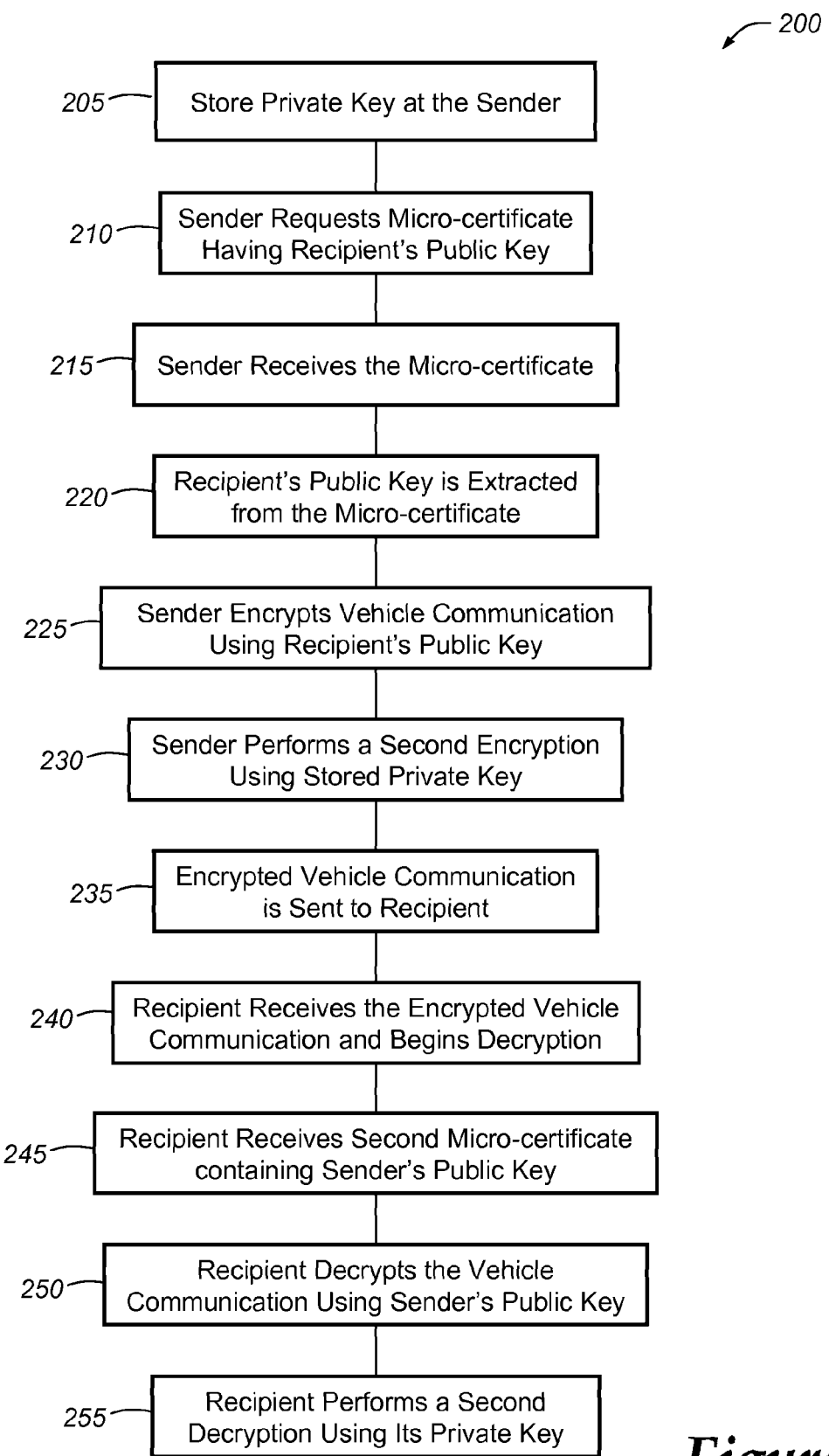
FIG. 2 is a method of encrypting and decrypting a vehicle communication using a micro-certificate.

Turning now to FIG. 2, there is a block diagram describing a method 200 of securing wireless communications. The method utilizes public key cryptography using public/private key pairs wherein the public key can be supplied in a micro-certificate such as that shown above in Table II. Once such a pair is generated for a sender, the private key is stored at the sender, as indicated at step 205. The public key can then be provided to others for use in sending secure communications to the sender or for verifying signed communications from the sender. This can be done by storing the public key at the sender and sending it when requested, or can be provided to a CA. Thus, for example, in the disclosed vehicle communications system 10, a private key associated with the vehicle can be stored in a vehicle telematics unit. Alternatively, or additionally, a private key belonging to the call center may be stored at the call center 20. Herein, terms such as sender and recipient are used alternately to represent either the vehicle 12 or call center 20 (or other entity communicating with the vehicle). In one implementation, the call center 20 can be the sender while the vehicle 12 or telematics unit 30 is the recipient. In another implementation, the vehicle 12 or telematics unit 30 can be the sender and the call center 20 or another entity can be the recipient. Regardless of whether a vehicle communication originates at the call center 20 or the vehicle 12, both can store unique private and public key pairs as is known in the art. The method 200 then proceeds to step 210.

At step 210, a micro-certificate that includes a recipient's public key is requested by the sender. When the vehicle 12 or call center 20 want to securely communicate with each other or the vehicle 12 wishes to securely communicate with another entity, the sender can encrypt the vehicle communication with the public key belonging to the recipient. And before the sender encrypts the vehicle communication, the sender obtains the public key belonging to the recipient. There are several places from which to obtain the recipient's public key. For instance, a certificate authority (CA) can hold the public keys for a number of entities and when a sender desires the recipient's public key, the sender can request the public key from the CA. Here, the CA can store a micro-certificate for any possible recipient and sender. When requested, the CA can send the micro-certificate, such as the implicit certificate, to the sender. The micro-certificate can be transmitted wirelessly via the wireless network 14. In one example, if the vehicle 12 anticipates sending the vehicle communications to the call center 20, the vehicle 12 can send a request to the CA using the telematics unit 30. The request can be relatively small, such as ~5 bytes. The request can include an identification number that identifies the recipient for which the vehicle 12 wants the micro-certificate. In another example, the call center 20 can send a request to the CA that includes a station identification number (STID). The STID can identify the telematics unit 30 or can identify both the telematics unit 30 and the vehicle. Using the STID, the CA can determine the appropriate micro-certificate to send to the call center 20. In yet another example, the sender can request a micro-certificate from the recipient rather than the CA. For example, the vehicle 12 can send a request for a micro-certificate to the call center 20. The request can include a STID that identifies the vehicle 20 to the call center and the call center 20 can then access a stored micro-certificate that includes a public key associated with the call center and send it to the vehicle 12 identified by the STID. The method 200 then proceeds to step 215.

At step 215, the micro-certificate is received by the sender. In one example, the vehicle 12 can receive the micro-certificate using the telematics unit 30 and antenna 56. Or the call center 20 can receive the micro-certificate via the cooperation of the wireless network 14 and the land network 16. The method 200 then proceeds to step 220.

At step 220, the public key belonging to the recipient is extracted from the micro-certificate in a manner that is known to those skilled in the art. The method 200 then proceeds to step 225.

At step 225, a first encryption of a vehicle communication is performed by the sender using the public key belonging to the recipient. It is envisioned that the vehicle communication can take several forms. For instance, the vehicle communication can be a short-message service (SMS) message sent over the data channel or the vehicle communication could be voice communications sent over the voice channel. Using the public key associated with the recipient, the vehicle communication is encrypted. This first encryption helps ensure that only the recipient can decrypt the vehicle communication. The method 200 then proceeds to step 230.

At step 230, the results of the first encryption are used to perform a second encryption by the sender using the private key stored at the sender. The first encryption, performed in step 225, helps ensure that only the recipient will be able to decrypt the vehicle communication. However, because the public key of the recipient may be widely available the recipient may not be able to ensure that the sender actually sent the vehicle communication rather than another entity using the recipient's public key. So after the vehicle communication is encrypted using the recipient's public key, the results of that encryption are encrypted a second time using the sender's private key. As a result, the recipient can both ensure the confidentiality of the vehicle communication and the identity of the sender. The method 200 then proceeds to step 235.

At step 235, the vehicle communication is sent to the recipient after the second encryption. Depending on the identity of the sender, this can occur in different ways. For instance, if the vehicle 12 is sending the vehicle communication, the telematics unit 30 can send the communication through the wireless network 14 using via the antenna 56. In another example, if the call center 20 is the sender, the call center 20 can send the vehicle communication via the land network 16 and the wireless network 16. The method 200 then proceeds to step 240.

At step 240, the sent vehicle communication is received and decryption begins. This can be accomplished using a private key stored by the recipient and a public key belonging to the sender. The recipient has possession of the private key stored previously at its location either at the call center or at the vehicle and the recipient then obtains the public key belonging to the sender that will be used in decryption. The method 200 then proceeds to step 245.

At step 245, a second micro-certificate is received from the CA or the sender that includes a public key belonging to the sender. In a manner similar to step 210, the recipient requests the second micro-certificate that includes the public key belonging to the sender. Upon receiving the second micro-certificate, the recipient extracts the public key belonging to the sender, as described above in relation to step 220, for use in decrypting the received vehicle communication. At this point, the recipient has the encrypted vehicle communication, the public key belonging to the sender, and the private key belonging to the recipient. The method 200 then proceeds to step 250.

At step 250, a first decryption is performed using the public key belonging to the sender to decrypt the results of the second encryption in step 230. The recipient uses the public key belonging to the sender to decrypt the vehicle communication previously encrypted by the sender's private key. This first decryption then renders the vehicle communication still encrypted by the recipient's public key. The method 200 then proceeds to step 255.

At step 255, a second decryption is performed using the private key belonging to the recipient. The vehicle communication, encrypted by only the recipient's public key, is then decrypted using the private key stored by the sender. Thereafter, the fully decrypted vehicle communication can be processed, stored or otherwise utilized by the recipient. Secure, authenticated communication can be carried out in both directions between two entities using this process.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of securing wireless communications, the method comprising:
    (a) storing a recipient's micro-certificate at a vehicle, a call center, or a certificate authority;
    (b) transmitting the micro-certificate from its place of storage, wherein the micro-certificate includes a public key having a length that is more than half the length of the micro-certificate;
    (c) extracting the public key from the micro-certificate;
    (d) encrypting a vehicle communication using the public key;
    (e) transmitting the encrypted vehicle communication to the recipient; and
    (f) decrypting the vehicle communication using a private key after receiving the vehicle communication.

2. The method of claim 1, wherein step (e) comprises transmitting the vehicle communication over a cellular voice channel.

3. The method of claim 1, wherein the length of the public key is greater than three-fourths of the length of the micro-certificate.

4. The method of claim 1, wherein the micro-certificate further comprises identification data that uniquely identifies the recipient.

5. The method of claim 1, wherein the micro-certificate comprises no more than 44 bytes.

6. The method of claim 1, wherein the micro-certificate comprises an elliptical-curve implicit certificate.

7. A method of securing wireless communications, the method comprising:
    (a) storing a private key at a vehicle;
    (b) requesting a micro-certificate at a vehicle telematics unit, wherein the micro-certificate includes a public key belonging to a recipient and an identifying data string;
    (c) receiving the micro-certificate at the vehicle;
    (d) extracting the public key belonging to the recipient from the micro-certificate;
    (e) generating a first encryption of a vehicle communication, wherein the communication is encrypted using the extracted public key belonging to the recipient;
    (f) performing a second encryption on the generated first encrypted vehicle communication using the private key stored at the vehicle; and
    (g) transmitting the results of the second encryption between a vehicle and the recipient.

8. The method of claim 7, further comprising the steps of:
    storing a private key belonging to the recipient at the recipient;
    requesting a second micro-certificate from a certifying agency or the vehicle that comprises a public key belonging to the vehicle;
    performing a first decryption using the public key belonging to the vehicle to decrypt the results obtained from the second encryption; and
    performing a second decryption using the private key belonging to the recipient.

9. The method of claim 7, wherein the vehicle communication includes communications over the voice channel.

10. The method of claim 7, wherein the vehicle communication includes short message service (SMS) messages or voice communications.

11. The method of claim 7, wherein the identifying data string includes a station identification number that identifies a particular vehicle.

12. The method of claim 7, wherein the micro-certificate comprises no more than 44 bytes.

13. The method of claim 7, wherein the public key has a length that is greater than three-fourths of the length of the micro-certificate.

14. A method of securing wireless communications, the method comprising:
    (a) storing a private key at a call center;
    (b) requesting a micro-certificate at a call center, wherein the micro-certificate includes a public key belonging to a vehicle and comprises no more than 44 bytes;
    (c) receiving the micro-certificate at the call center;

(d) extracting the public key belonging to the vehicle from the micro-certificate;
(e) performing a first encryption of a vehicle communication at the call center using the public key belonging to the vehicle;
(f) using the results of the first encryption to perform a second encryption at the call center using the private key stored at the call center; and
(g) after the second encryption, sending the vehicle communication to the vehicle.

15. The method of claim 14, further comprising the steps of:
storing a private key belonging to the vehicle at the vehicle;
requesting a second micro-certificate from a certifying agency or the call center that comprises a public key belonging to the call center;
performing a first decryption using the public key belonging to the call center to decrypt the results obtained from the second encryption; and
performing a second decryption using the private key belonging to the vehicle.

16. The method of claim 14, wherein the vehicle communication comprises communications over the voice channel.

17. The method of claim 14, wherein the public key has a length that is more than half the length of the micro-certificate.

18. The method of claim 14, wherein the length of the public key is greater than three-fourths of the length of the micro-certificate.

19. The method of claim 14, wherein the micro-certificate further comprises certificate expiration data and identification data that uniquely identifies the recipient.

* * * * *